United States Patent [19]
Bartos

[11] Patent Number: 6,099,612
[45] Date of Patent: Aug. 8, 2000

[54] SIDE ACCESS FILTER SUPPORT AND SEALING SYSTEM

[75] Inventor: Paul F. Bartos, Mesquite, Tex.

[73] Assignee: Filtration Group, Inc., Joliet, Ill.

[21] Appl. No.: 09/148,226

[22] Filed: Sep. 4, 1998

[51] Int. Cl.[7] ............................ B01D 29/52; B01D 35/30
[52] U.S. Cl. .............................. 55/481; 55/482; 55/484; 55/502; 55/511
[58] Field of Search ............................ 55/481, 478, 483, 55/484, 486, 502, 508, 511, 482

[56] References Cited

U.S. PATENT DOCUMENTS

| | | | |
|---|---|---|---|
| 3,247,652 | 4/1966 | Annas et al. | 55/481 |
| 3,423,908 | 1/1969 | Hart | 55/481 |
| 3,426,456 | 2/1969 | Sharp | 55/481 |
| 3,581,478 | 6/1971 | Smith | 55/484 |
| 3,590,562 | 7/1971 | Byers et al. | 55/484 |
| 3,630,008 | 12/1971 | Revell | 55/493 |
| 3,884,662 | 5/1975 | Hladik | 55/481 |
| 4,124,361 | 11/1978 | Revell | 55/493 |
| 4,217,122 | 8/1980 | Shuler | 55/490 |
| 4,251,246 | 2/1981 | Andreychek | 55/481 |
| 4,264,345 | 4/1981 | Miller | 55/341 R |
| 4,521,234 | 6/1985 | Peebles, Jr. | 55/481 |
| 5,399,180 | 3/1995 | Kopp | 55/493 |
| 5,447,544 | 9/1995 | Birdwell | 55/480 |
| 5,458,667 | 10/1995 | Poggi, Jr. | 55/480 |
| 5,512,074 | 4/1996 | Hanni et al. | 55/484 |

OTHER PUBLICATIONS

Cambridge Side–Flo & Side–Cap, Bulletin 180C, Cambridge Filter Corp., dated Jul. 1967, pp. 1–8.

*Primary Examiner*—David A. Simmons
*Assistant Examiner*—Robert A. Hopkins
*Attorney, Agent, or Firm*—Dennis T. Griggs

[57] ABSTRACT

An air flow filter assembly of the side-loading type includes a filter guide track adjacent a side access opening for supporting multiple air filter elements in an operative position across the air flow passage. An internal closed loop seal assembly provides an effective, independent peripheral seal for each track-mounted filter element. A gasket retainer, mounted within the air flow passage adjacent the filter track, includes frame segments forming a rectangular gasket frame bordering one or more air flow windows or cells. A seal gasket is mounted on each gasket frame, with each seal gasket including a resilient flange portion extending in a closed loop around each air flow window or cell. The closed loop flange portion projects from the gasket frame for engaging and resiliently sealing along the face of a filter element supported on the filter track in air flow alignment with the air flow window or cell. According to this arrangement a continuous, positive seal is established around the border casing of each filter element. Each filter element is sealed independently of laterally adjoining or vertically adjoining filter elements in a multiple element filter array.

16 Claims, 6 Drawing Sheets

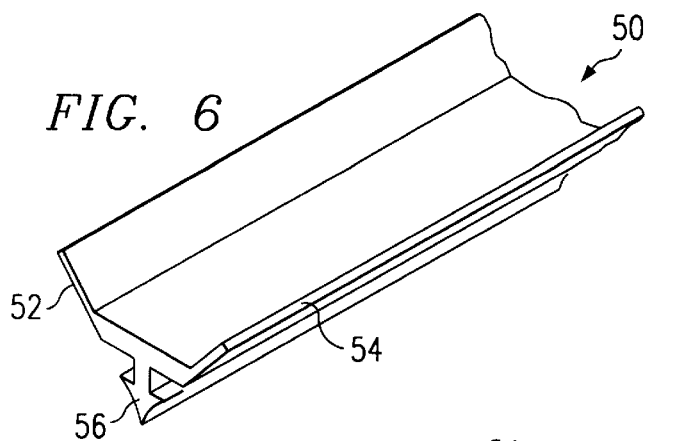
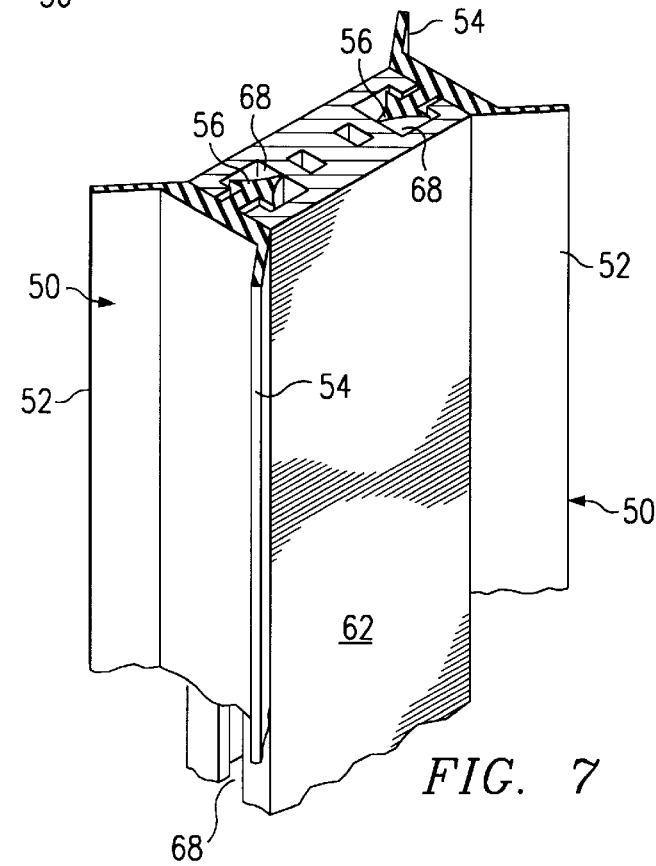
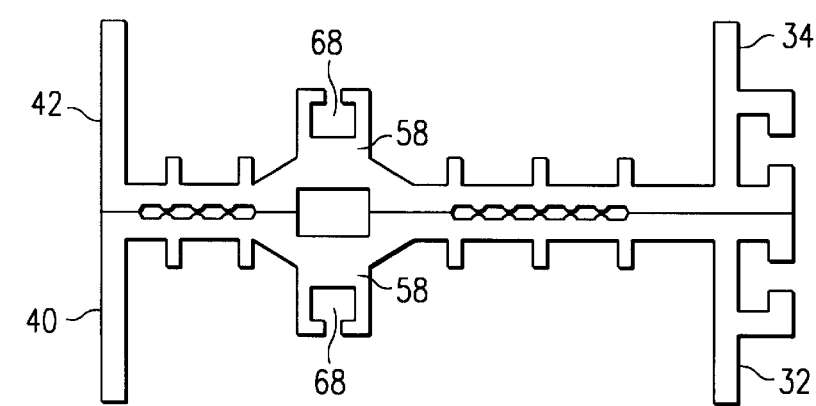

SIDE ACCESS FILTER SUPPORT AND SEALING SYSTEM

BACKGROUND OF THE INVENTION

This invention relates generally to air filtration apparatus, and in particular to a side access filter assembly incorporating multiple filter elements.

There are a number of indoor air quality applications in which clean conditioned air must be supplied into an enclosed living space or work space that is exposed to hazardous airborne particulates. In the typical application, conditioned air is cleaned by one or more stages of air filters which receive fresh outdoor air along with return room air and are designed to absorb or capture undesirable chemical vapors and/or airborne particulate materials.

Conventional air filters include chemical filters with an impregnated activated filter media; high efficiency bag filters; high efficiency particulate arrestance (HEPA) filters; spun fiberglass and paper media; and synthetic filter media. A high efficiency bag filter is sometimes used as a secondary stage in combination with a pre-filter stage for capturing respirable (4.0 microns to 0.3 micron) particles. High efficiency filter arrangements are used in surgical facilities, medical wards, clean rooms, computer rooms, laboratories and other commercial applications where maintenance of clean and particle-free air is essential.

A widespread problem in the use of high efficiency air filters is bypass leakage around the filter element casing frames. Typically, multiple filter elements are arranged and supported in a rectangular array, sometimes stacked vertically in two or more rows across the air flow passage. Unsealed air gaps between adjacent filter elements and unsealed air gaps between the filter elements and the filter housing, which may be as large as 0.125 inch to 0.625 inch wide, present a path of least resistance in which a significant amount of unfiltered air leaks around and bypasses the filter elements and thus substantially reduces system efficiency. Consequently, a high efficiency bag filter designed to trap respirable particles can be compromised by an unsealed air gap which could be as much as 13,500 microns wide. Because air flow always follows the path of least resistance, more unfiltered air flows through such gaps as the air flow rate increases and the filter becomes saturated with particulates.

Various gaskets and seals have been employed or proposed for forming a positive seal between the filter elements and the surrounding air flow housing. Some conventional seal assemblies do not provide an adequate seal, and others interfere with the inspection and/or replacement of the filter elements. For example, open cell foam pads are installed where air gaps are likely to occur. Over time, the foam pads deteriorate, shrink and open a bypass air gap. Other arrangements use oversized filter housings and frames to provide flat surfaces for engaging multiple seal elements which create more by-pass leakage gaps as they deteriorate, thus increasing the maintenance burden. Since most airborne contaminates are not visible and are difficult to detect, the indoor air quality of critical clean rooms, hospital areas and delicate production processes may be compromised or placed at risk.

Conventional air filter elements are typically mounted on filter guide tracks that support the filter elements in an operative service position across the air flow passage. Conventional guide tracks are slightly oversized by as much as 0.54 inch to allow the filter elements to slide smoothly in and out. This oversizing creates a gap along the track and at opposite ends of the track through which contaminate-laden air can completely bypass the filter elements. A typical method for sealing track-mounted filter elements is by a strip of felt or nylon pile gasket material. The felt or nylon strip is packed in the filter tracks to fill the voids between the filter frame and the filter track channels.

Such packing materials typically do not completely fill the gaps between the filter tracks and the filter casing, or between the corners of the filters and the surrounding housing. Moreover, no provision is made for sealing the abutment gaps between adjacent filter elements that are loaded on the same filter track. A further limitation on the use of gasket packing material is that such sealing strips become compacted and deformed after repeated insertion and removal of the air filter elements. Upon compaction, the felt or nylon pile gasket becomes separated from the filter frame, thus opening a leakage gap.

Another seal assembly which is used in combination with track-mounted, multiple filter elements includes a foam gasket strip that is clamped against the casing face of each filter element. The clamp must be manually tightened to compress the foam gasket material between the filter casing face and the air flow housing. Such manual clamping arrangements are difficult to implement for those filter elements that lie beyond or near the limit of the operator's reach.

Accordingly, there is a continuing interest in providing an effective seal between one or more air filter element and the supporting track structure within a side access filter housing, which will permit the filter elements to be inserted into and retrieved from the air flow filter housing without damaging the seal elements, and which reliably produces a positive seal upon full insertion of the filter elements, without requiring manual clamping or other manual adjustment.

BRIEF SUMMARY OF THE INVENTION

The seal assembly of the present invention provides an effective peripheral seal between an air filter element and its supporting structure in a track-mounted filter assembly that is installed in the air flow passage of a side access air flow filter housing. The seal assembly includes a gasket retainer frame mounted within the air flow passage adjacent a filter guide track, with the gasket retainer frame being intersected by a longitudinal slot for retaining a flexible gasket strip. The flexible gasket strip includes a base portion mounted in the retainer slot and a resilient flange portion projecting transversely from the gasket retainer frame for deflecting and resiliently engaging peripheral casing portions of a filter element supported on the filter guide track in an operative service position.

In the preferred embodiment, the gasket retainer frame is mounted adjacent an extruded metal filter track that extends across the air flow passage. The resilient gasket flange projects outwardly from the gasket retainer frame for sealing engagement against a filter element. As the filter element is inserted along the track, the externally projecting, resilient flange portion of the gasket deflects and yieldably engages the casing face of the filter element.

The gasket retainer frame includes frame segments forming a border around one or more air flow windows or cells. An elongated seal gasket forms a closed loop around the border of each air flow window or cell. Externally projecting flange portions of the seal gasket yieldably deflect in response to sliding engagement against a filter element, thereby providing a positive, continuous seal against the facing surface of the filter element casing in the operative service position. This continuous, closed loop seal prevents leakage between abutting filter elements as well as between each filter element, the filter guide tracks and the adjacent air flow filter housing panels. The filter guide tracks and gasket flanges are dimensioned appropriately to allow yieldable deflection and establish positive sealing engagement of the resilient gasket flange along a continuous, closed loop sealing pattern against the face of the filter element casing upon insertion of an air filter element in alignment with an air flow window or cell.

This internal seal filter support and closed loop gasket arrangement creates a continuous, positive seal between each filter element, the guide track and the adjacent housing panels, thereby eliminating bypass leakage. Since the flange portions of each closed loop gasket are resilient and deflectable, the gasket does not interfere with filter removal or replacement. As air pressure is exerted on the filter, the sealing force increases and the gasket seal becomes more effective as air flow through the filter assembly increases. This positive seal arrangement eliminates air leakage gaps and funnels the air through the filter media, thus improving filter effectiveness. When higher air flow rates or saturated filters increase differential pressure within the system, the higher differential pressure forces the resilient gasket flanges more tightly against the filter casing, thus providing a more intense seal. Under these conditions, the filter media becomes the path of least resistance for air flow, thus providing full, complete filtration.

BRIEF DESCRIPTION OF THE DRAWINGS

The accompanying drawing is incorporated into and forms a part of the specification to illustrate the preferred embodiment of the present invention. Throughout the drawing, like reference numerals designate corresponding elements. This drawing, together with the description, serves to explain the principles of the invention and is only for the purpose of illustrating an exemplary embodiment showing how the invention can best be made and used. The drawing should not be construed as limiting the invention to the illustrated and described embodiments. Various advantages and features of the invention will be understood from the following detailed description taken in connection with the appended claims and with reference to the attached drawing in which:

FIG. 6 is a perspective view, partially broken away, of the resilient seal member of the present invention;

FIG. 7 is a perspective view, partially broken away and partially in section, of a double-sided seal assembly with twin seal elements for sealing the interface between abutting filter elements;

FIG. 8 is a perspective view, partially in section and partially broken away, of a single-sided seal assembly for producing a seal between the filter housing and the end portions of the filter elements;

FIG. 9 is a side elevational view of a filter track for supporting a pre-filter, a bag filter and the seal assemblies of FIG. 7 and FIG. 8;

DETAILED DESCRIPTION OF THE INVENTION

Figure 1:
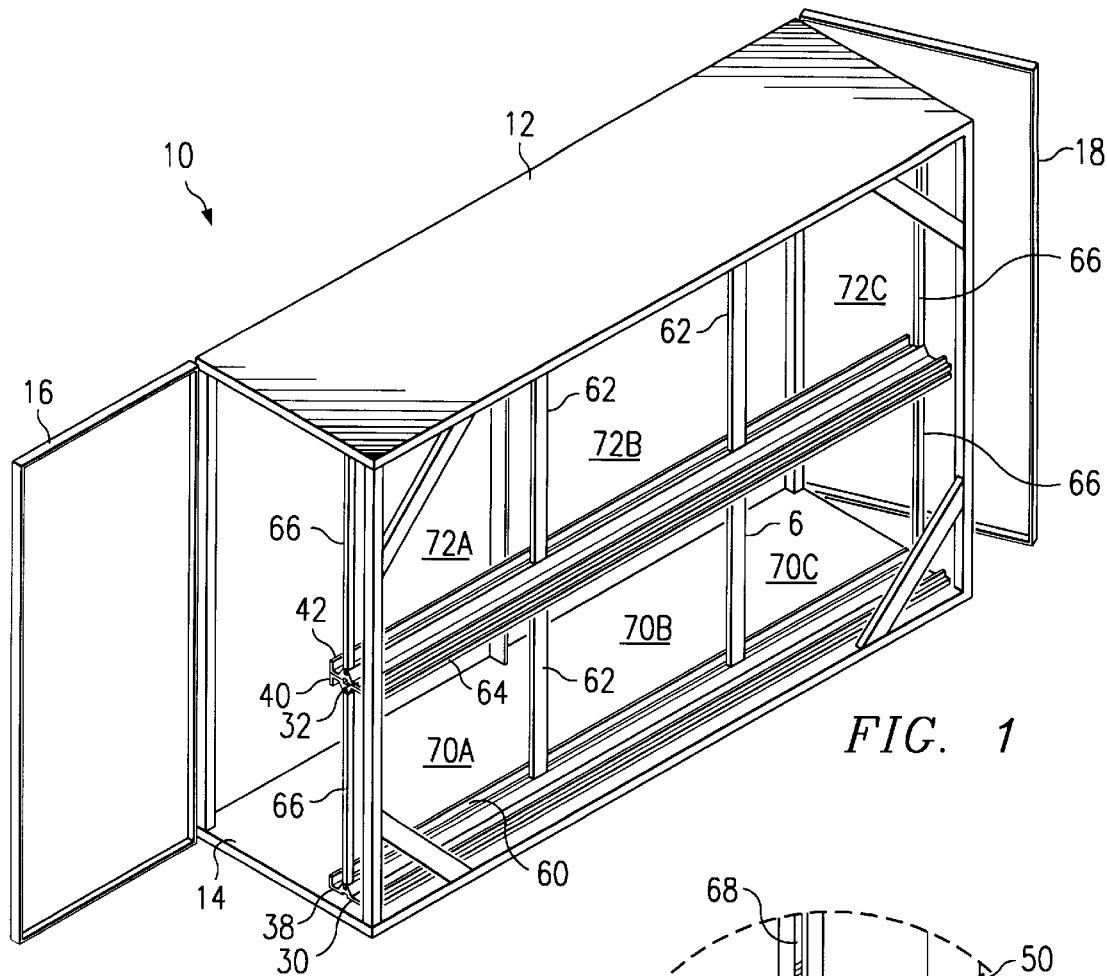
FIG. 1 is a perspective view of a filter housing incorporating the filter element sealing and support apparatus of the present invention.
Figure 3:
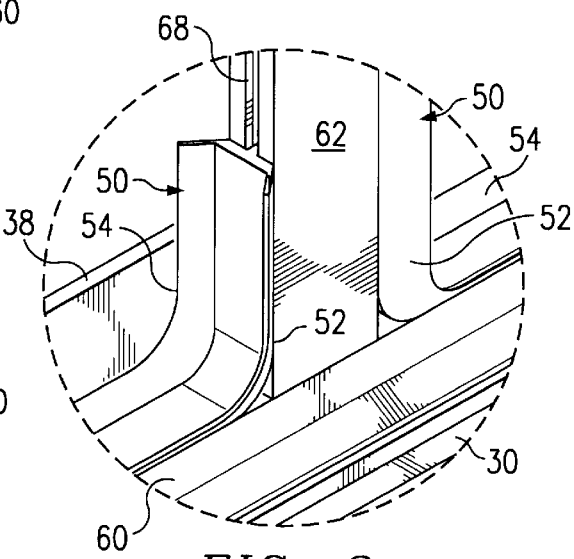
FIG. 3 is a close-up perspective view, partially broken away, of the peripheral seal element of the present invention.
Figure 2:
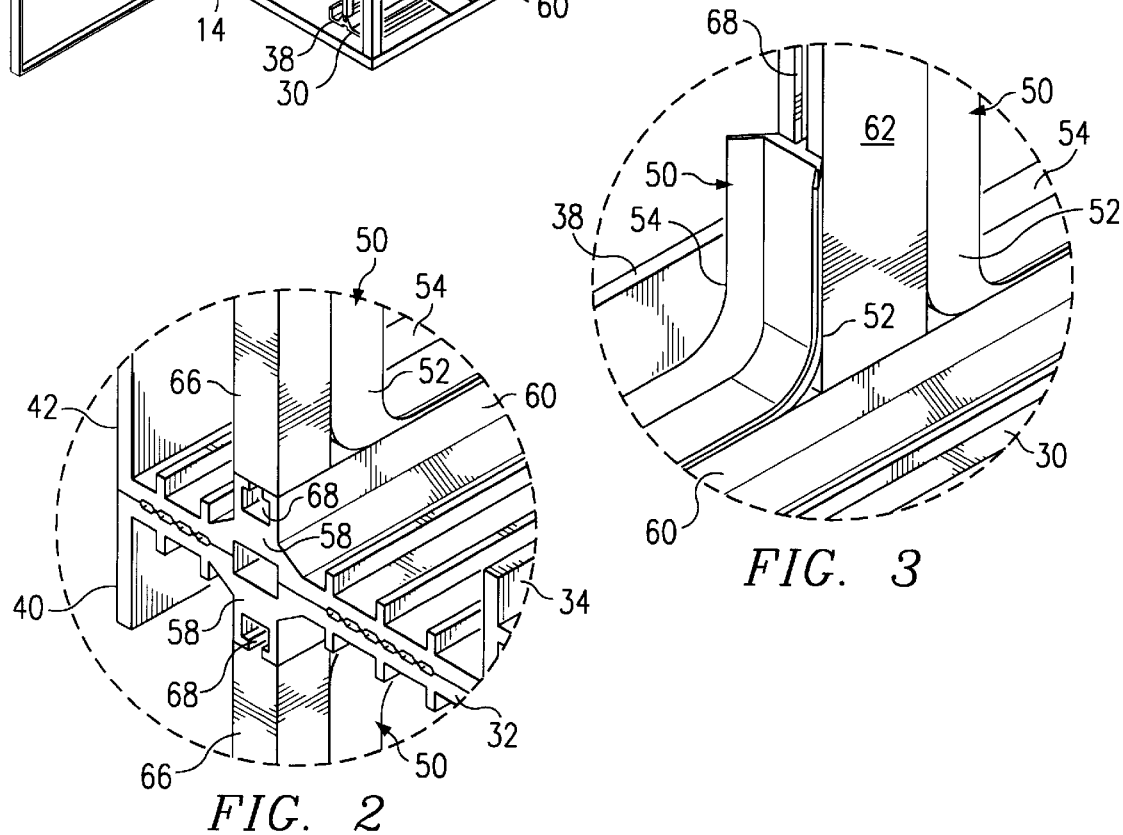
FIG. 2 is a close-up perspective view, partially broken away, of the filter element sealing and support apparatus shown in FIG. 1.

A preferred embodiment of the invention is described herein by referring to various examples of how the invention can be made and used. Like reference numerals are used throughout the description and several views of the drawing to indicate like or corresponding parts.

Figure 4:
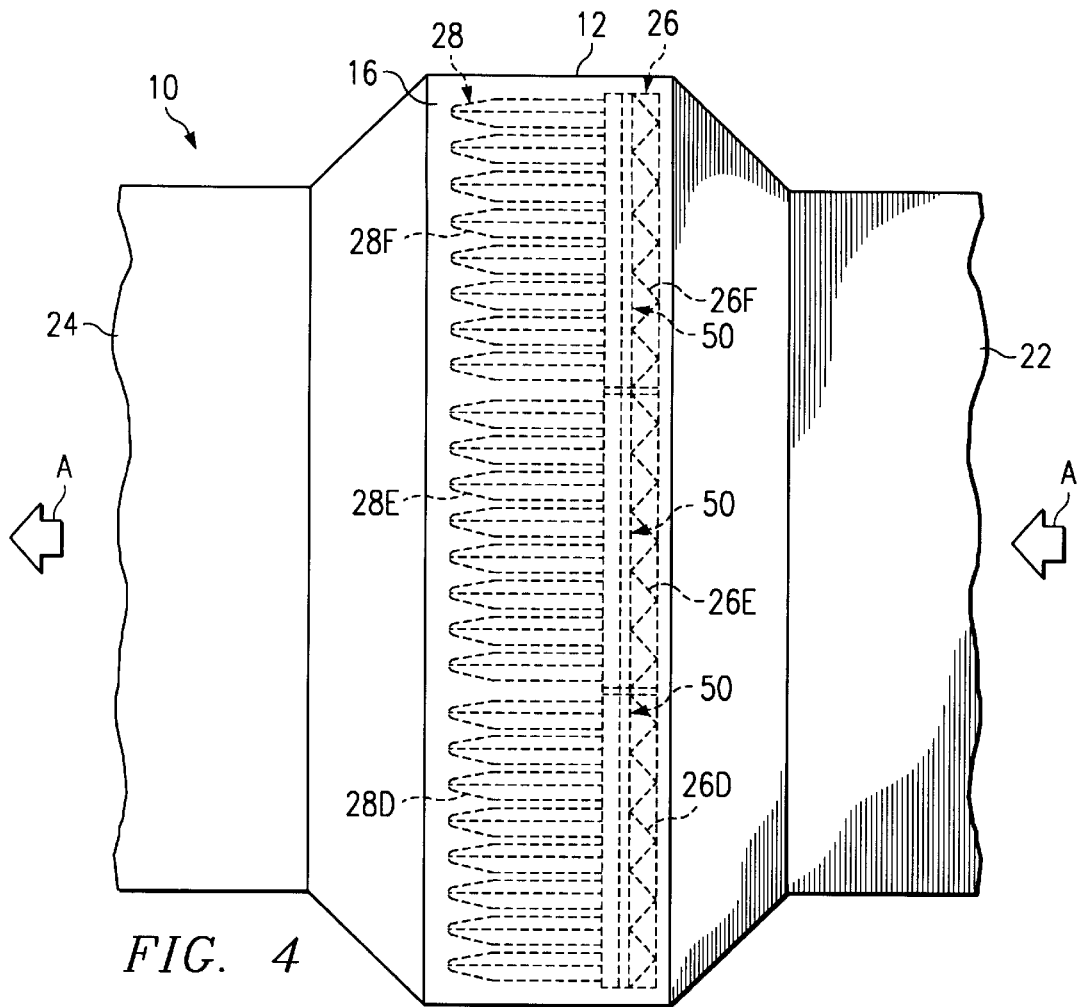
FIG. 4 is a top plan view of the filter housing, with pre-filter elements and secondary filter elements being indicated in phantom.
Figure 5:
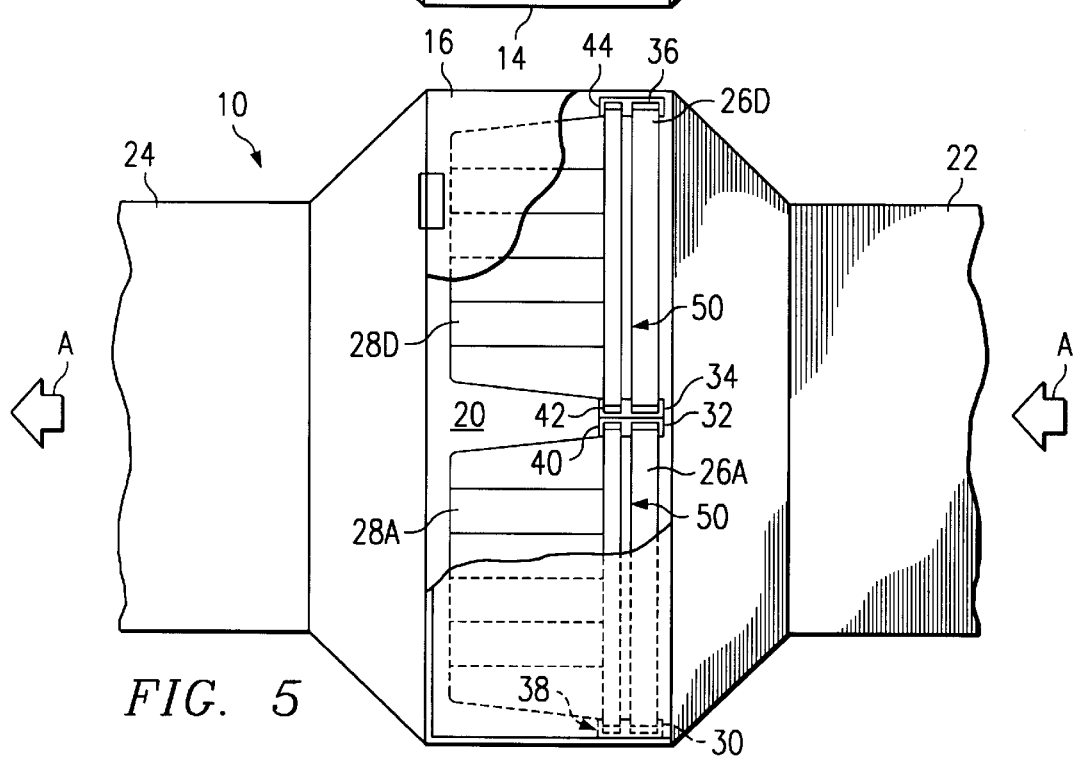
FIG. 5 is a side elevational view of the filter housing shown in FIG. 1, partially broken away, showing the installation of pre-filter and secondary filter elements on the sealing and support apparatus of the present invention.

Referring now to FIG. 1, FIG. 4 and FIG. 5, a side access air flow filter housing 10 includes interconnected top and bottom panels 12, 14 and side access door panels 16, 18 forming sidewall boundaries of an air flow passage extending between an air flow inlet duct 22 and an air flow outlet duct 24. Conditioned air, indicated by the arrow A, is cleaned by two stages of air filters, a pre-filter stage 26 and a high efficiency secondary filter stage 28 for capturing respirable (4.0 microns to 0.3 microns) particles. This dual stage filter arrangement is intended for use in applications in which fresh outdoor air along with return room air must be filtered to absorb or capture undesirable chemical vapors and/or airborne particulate materials, for example in surgical facilities, medical wards, clean rooms, computer rooms, laboratories and other commercial applications where maintenance of clean and particle-free air is essential. Typically, the conditioned air A is moved at a flow rate of 500 feet per minute, with the various applications requiring capture of 60%–95% of particles in the 2–3 micron size range (ASHRA dust spot test).

In the exemplary embodiment, the pre-filter stage 26 includes three pleated pre-filter elements 26A, 26B, 26C arranged in a first row and three pleated pre-filter elements 26D, 26E and 26F arranged in a second row immediately above the first row. The air filter elements of the pre-filter stage 26 are confined between vertically spaced filter guide tracks 30, 32 and 34, 36 that support the filter elements in two rows of three pre-filter elements each across the air flow passage 20.

The secondary filter stage 28 includes six high efficiency bag filters supported in two vertically stacked rows of three bag filters each. According to this arrangement, the lower row of bag filters 28A, 28B and 28C are supported on filter guide tracks 38, 40 and the upper row of bag filters 28D, 28E and 28F are supported on filter guide tracks 42, 44.

Figure 13:
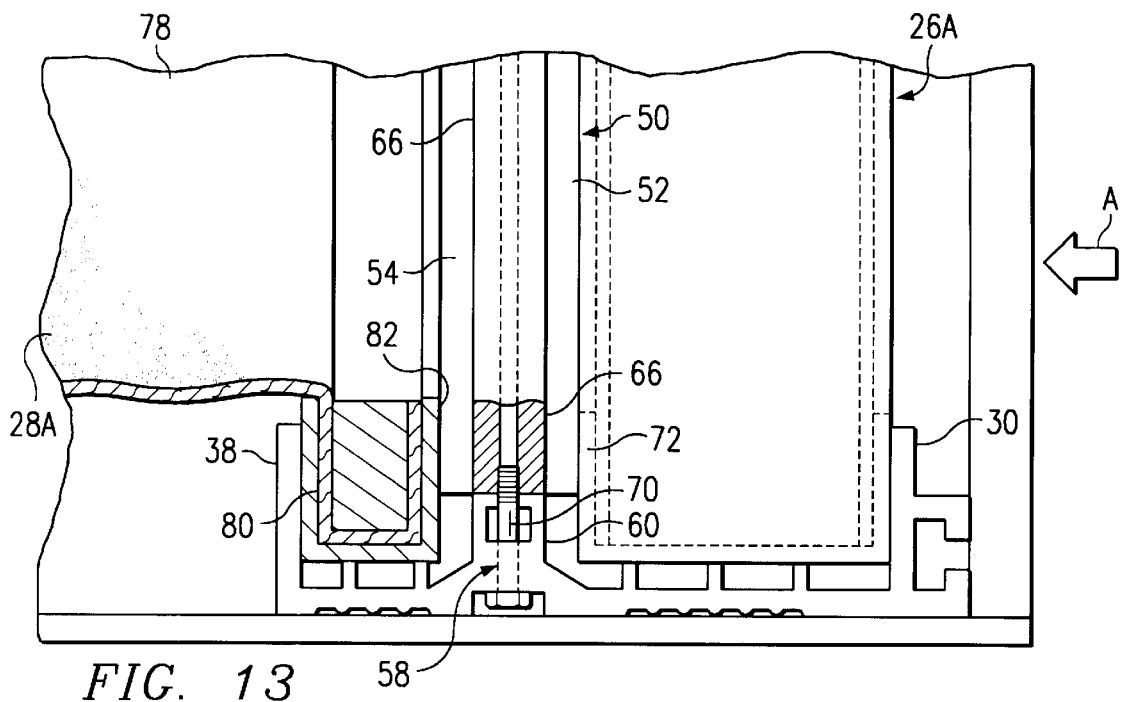
FIG. 13 is a side elevational view thereof, partially broken away and partially in section; and, FIG. 14 is a perspective view of the closed loop gasket shown in FIG. 1, FIG. 2 and FIG. 3.

The filter guide tracks are constructed of extruded aluminum. Preferably, the lower pre-filter guide track 30 and the lower secondary filter guide track 38 are integrally formed in parallel aligned extrusions, whereby the filter elements of the pre-filter stage 26 are aligned with and spaced a predetermined distance apart from the high efficiency bag filter elements of the secondary stage 28. Likewise, the upper pre-filter guide track 32 and upper secondary guide track 40 are integrally formed in parallel aligned extrusions. The guide tracks are slightly oversized, as indicated in FIG. 13, to permit the filter elements to slide smoothly in and out during installation and replacement.

It will be appreciated that this oversizing creates a gap along each guide track and at the opposite ends of each guide track through which contaminate-laden air can completely bypass the filter elements. Such bypass leakage is prevented according to the present invention by a resilient gasket seal member 50 as shown in FIG. 6, FIG. 7, FIG. 8 and FIG. 14. The resilient gasket 50 is an extruded strip of synthetic polymer material such as polyvinyl chloride. The gasket seal member 50 includes a pair of resilient flange strips 52, 54 integrally formed with a wedge-shaped base strip 56 as shown in FIG. 6.

In the preferred embodiment, the seal gasket 50 is constructed of extruded polyvinyl chloride, in which the seal flanges 52, 54 are 0.030 inch thick and the head of the wedge-shaped base member 56 has a thickness of 0.060 inch. The preferred polyvinyl chloride material has a specific gravity of 1.41; a hardness value of 70 (Shore A—15 sec.); tensile strength of 14,000 lbs. per square inch; elongation percent factor of 350; and a brittle point at −39° C.

Figure 14:
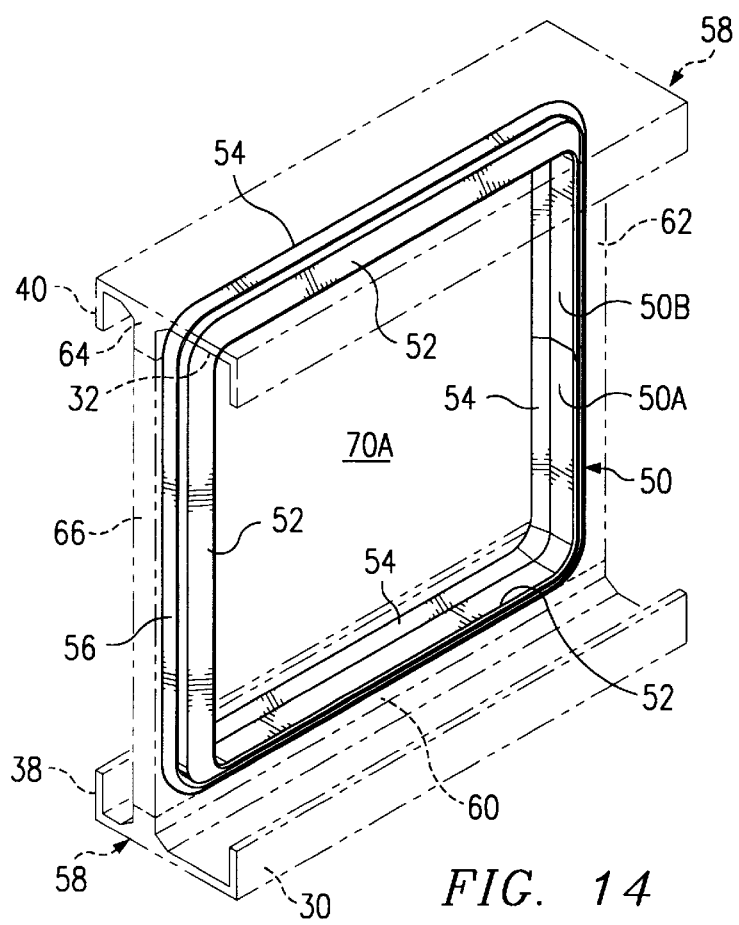

As shown in FIG. 14, the seal gasket 50 is arranged in a substantially continuous, closed loop, with its end portions 50A, 50B secured together in a butt union by suitable means, for example, a thermal weld, adhesive, or by a chemical weld which will produce an airtight seal across the interface of the butt union.

A separate gasket seal 50 is supported between each aligned pair of pre-filter and secondary filter elements by a gasket retainer frame 58. Referring again to FIG. 1, FIG. 13 and FIG. 14, the gasket retainer frame 58 includes multiple frame segments 60, 62, 64 and 66 forming rectangular borders around air flow windows or cells 70A, 70B, 70C in a lower row and also forming rectangular borders around air flow windows or cells 72A, 72B and 72C in an upper row. Each air flow window or cell is positioned in air flow alignment with a pre-filter/secondary filter pair in the operative service position.

Each gasket seal member 50 is coupled to the gasket retainer frame segments by push-fit, interlocking engagement of the wedge-shaped base strip 56 within a retainer slot 68 intersecting the inside face of each frame segment. According to this arrangement, the gasket seal member 50 is retained around the inside border of each air flow window in a closed loop, with the flange portions 52, 54 providing a continuous seal around each corner, thereby completely encircling each air flow window or cell.

Preferably, at least one window segment portion, for example lower segment 60 and upper segment 64, are integrally formed with the extruded guide tracks 30, 38 and guide tracks 32, 40, respectively. The vertical side segments 62, 66 are secured between the lower and upper segments by threaded fasteners 70, for example as shown in FIG. 13. According to this arrangement, the resilient gasket flanges 52, 54 project outwardly from the gasket retainer frame for sealing engagement against a filter element that is supported on the guide tracks in air flow alignment with an air flow window or cell. As a filter element is inserted along the guide track 30, for example the pre-filter element 26A, the externally projecting, resilient flange member 52 of the gasket 50 deflects and yieldably engages the casing 72 of the pre-filter element.

Figure 10:
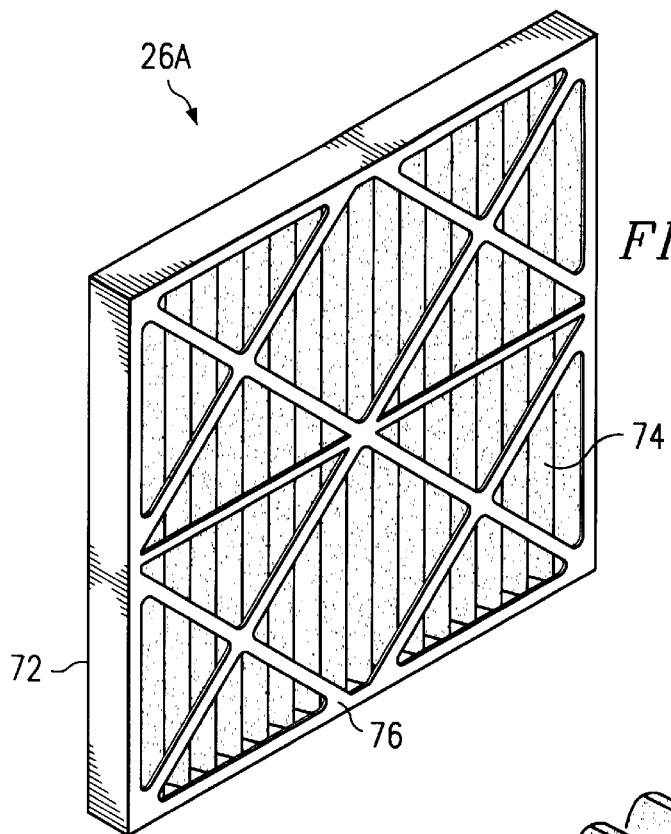
FIG. 10 is a perspective view of a pre-filter element supported within a rigid casing.
Figure 12:
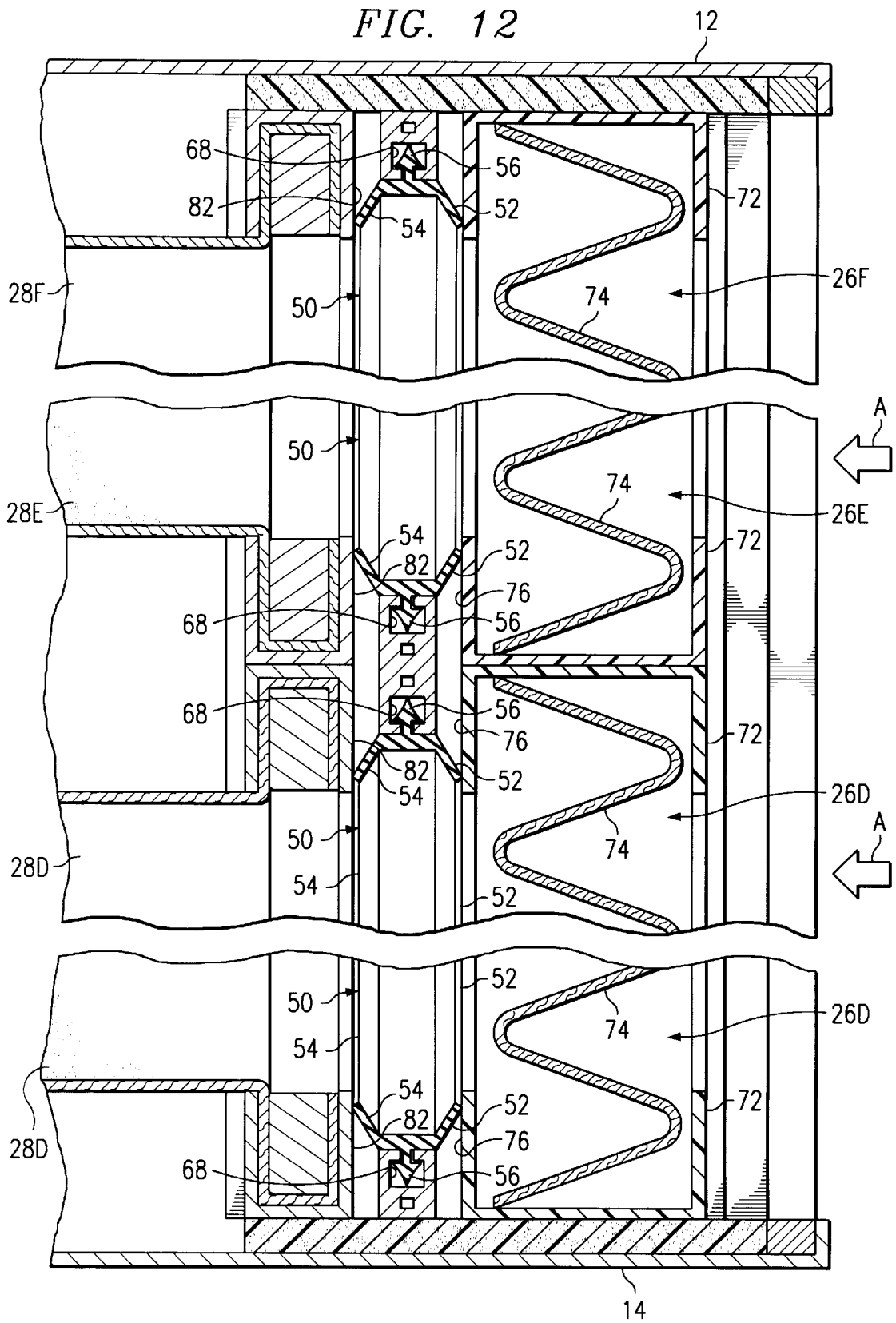
FIG. 12 is a top plan view, partly in section and partly broken away, of the filter housing shown in FIG. 1, with pre-filter elements and bag filters loaded into the filter tracks in positive sealing engagement with the seal assembly of the present invention.

Referring to FIG. 10, the pre-filter element 26A includes a pleated media 74 of a cotton polymer blend that is enclosed within a rectangular casing 72 constructed of moisture-resistant, double-wall Kraft paper. The casing 72 presents a continuous face 76 around the perimeter of the pre-filter media 74 that provides a smooth sealing surface for engagement against the resilient seal flange 52, as shown in FIG. 12 and FIG. 13.

Referring to FIG. 9 and FIG. 13, the filter guide tracks are spaced on opposite sides of the gasket retainer frame 58 and are dimensioned appropriately to produce deflection loading and establish positive sealing engagement against each resilient gasket flange 52, 54 along a continuous, closed loop sealing pattern against the face of the pre-filter element casing surface 76 upon insertion of a pre-air filter element in alignment with an air flow window or cell.

Figure 11:
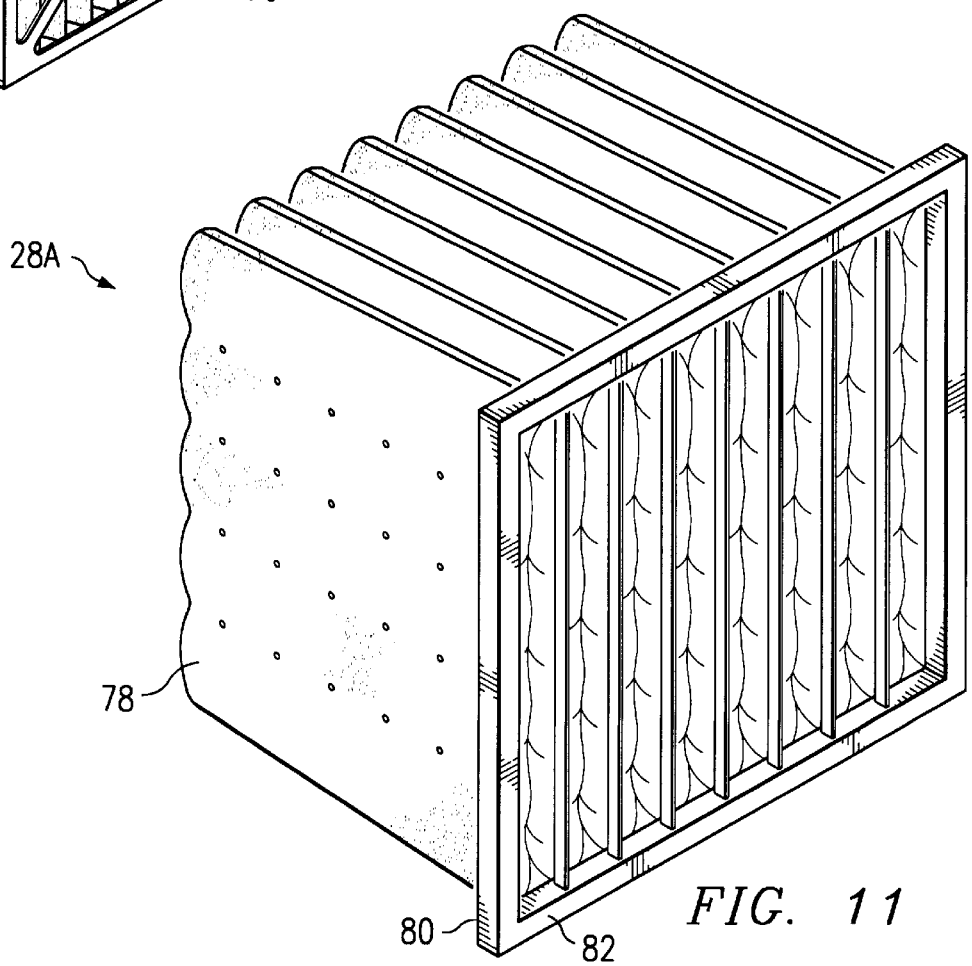
FIG. 11 is a perspective view of a multiple compartment bag filter assembly.

Referring to FIG. 11, the high efficiency bag filter 28A includes polypropylene filter media 78 secured by sonic welds to form separate bag elements that are stabilized by a galvanized metal header 80. The metal header 80 presents a continuous face 82 around the perimeter of the bag media 78 that provides a smooth sealing surface for engagement against the resilient seal flange 54 as shown in FIG. 12 and FIG. 13.

Referring again to FIG. 12, FIG. 13 and FIG. 14, each air flow window or cell 70A, 70B, 70C and 72A, 72B, 72C is circumscribed by a closed loop gasket seal member 50 which simultaneously establishes a continuous seal around the facing surface 76 of the pre-filter casing frame 72 and also establishes a continuous seal around the facing surface 82 of the bag filter header 80. The resilient, closed loop flange strips 52, 54 yieldably deflect in response to sliding engagement against a filter element, thereby providing a positive, continuous seal around the facing surface of the filter element casing in the operative service position. Each continuous, closed loop seal 50 prevents leakage between abutting filter elements as well as between each filter element and the adjacent air flow filter housing panel. Each filter is sealed around the entire header or casing frame in a single plane.

Since the nominal size of the filter casing or header for the pre-filters and secondary filters are identical (in the exemplary embodiment, 24"×24"), the size of each potential gap is substantially reduced. Moreover, because of the exact width of each filter element and the exact length of the guide track, each potential gap is precisely located with respect to the gasket seal flanges, thereby assuring effective seal isolation completely around each filter media. That is, each gasket seal is positively located by the fixed frame segments, and the filter elements are precisely located with respect to the air flow windows and the gasket loops when the filters are loaded in the operative service position.

The width of the filter guide tracks and the depth of the gasket flanges are dimensioned appropriately to cause the resilient flange members 52, 54 to deflect inwardly by about $\frac{1}{16}$ inch–$\frac{1}{8}$ inch when the pre-filter elements and the bag filter elements are loaded onto the guide tracks. Additionally, the length of the guide tracks and the width of the gasket retainer frames are appropriately dimensioned whereby the pre-filter elements and bag filter elements are automatically centered in air flow alignment with the air flow windows or cells when a predetermined number of filter elements are loaded on the filter tracks as indicated in FIG. 4, FIG. 5 and FIG. 12.

Since the flange portions 52, 54 of each closed loop gasket 50 are resilient and deflectable, the closed loop gasket does not interfere with filter removal or replacement, and the gasket flanges are not damaged by insertion and withdrawal of the filter elements. Moreover, the closed loop seal around each filter element is automatically established upon full insertion of the filter elements, without requiring manual adjustment.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

What is claimed is:

1. Air flow filter apparatus including an air filter housing with interconnected panels forming sidewall boundaries of an air flow passage between an air flow inlet and an air flow outlet, one of the housing panels being intersected by an access opening for permitting the insertion one or more filter elements into the air flow passage and subsequent removal of filter elements therefrom; a filter track disposed adjacent the access opening for supporting an air filter element in an operative service position across the air flow passage; and, a gasket assembly disposed within the air flow passage for engaging a filter element supported on the filter track in the operative service position, the gasket assembly comprising:

a gasket retainer frame extending across the air flow passage adjacent the filter track;

a gasket mounted on the gasket retainer frame, the gasket including a resilient flange strip projecting from the gasket retainer frame for yieldably engaging a filter element supported on the filter track in the operative service position;

the gasket retainer frame being intersected by a retainer slot; and, the gasket including a base portion disposed in the retainer slot, and the resilient flange strip projecting transversely with respect to a filter element supported on the filter track in the operative service position.

2. Air flow filter apparatus comprising an air flow housing including a side access opening, a guide track disposed adjacent the side access opening for supporting an air filter in an operative service position across an air flow passage within the air flow housing, and a gasket assembly for establishing a seal against an air filter supported on the guide track in the operative service position, the gasket assembly including a gasket retainer frame disposed adjacent the guide track, the gasket retainer frame forming a border around an air flow window or cell, and including a seal gasket mounted on the gasket retainer frame, the seal gasket including a resilient flange strip projecting from the gasket retainer frame and extending along a closed loop around the air flow window or cell for establishing a substantially continuous seal against a filter element supported in the operative service position on the guide track in air flow alignment with the air flow window or cell.

3. Air flow filter apparatus including an air filter housing with interconnected panels forming sidewall boundaries of an air flow passage extending between an air flow inlet and an air flow outlet, one of the housing panels being intersected by an access opening for permitting the insertion and removal of at least one air filter element into and out of the air flow passage, a guide track disposed adjacent the access opening for supporting one or more air filter elements in an operative position across the air flow passage, and a gasket seal assembly disposed adjacent the guide track, the gasket seal assembly including a resilient flange strip extending in a closed loop for yieldably engaging and sealing against a filter element supported on the guide track in the operative service position.

4. Air flow filter apparatus including an air filter housing and a gasket assembly for establishing a seal against a filter element that is supported on a guide track disposed in an operative service position across an air flow passage in the air filter housing, the gasket assembly including a gasket retainer frame mounted within the air flow passage adjacent the guide track and a flexible gasket mounted on the gasket retainer frame, the flexible gasket including a resilient flange strip projecting transversely from the gasket retainer frame for yieldably engaging a filter element supported on the guide track in the operative service position;

wherein the gasket retainer frame comprises frame segments forming a border around an air flow window or cell, and each frame segment being intersected by a longitudinal retainer slot, and the flexible gasket including a wedge strip integrally formed with the resilient flange strip, the wedge strip extending through the retainer slots and disposed in interlocking engagement with the retainer frame.

5. Air flow filter apparatus as set forth in claim 4, wherein the guide track is constructed of extruded metal, and the gasket retainer frame is integrally formed with the extruded metal guide track.

6. Air flow filter apparatus as set forth in claim 4, wherein the gasket retainer frame comprises frame segments forming a border around an air flow window or cell, and the resilient flange strip extending around the air flow window or cell.

7. Air flow filter apparatus as set forth in claim 4, wherein the resilient flange strip extends along a substantially closed loop for yieldably engaging the face of a filter element disposed in air flow alignment with the air flow window or cell.

8. Air flow filter apparatus as set forth in claim 4, wherein the resilient flange strip extends through a closed loop with its end portions being secured together in a butt union.

9. Air flow filter apparatus including an air filter housing with interconnected panels forming sidewall boundaries of an air flow passage; a filter track for supporting an air filter element in an operative service position across the air flow passage; and, a gasket assembly disposed within the air flow passage for engaging a filter element supported on the filter track in the operative service position, the gasket assembly comprising:

a gasket retainer frame extending across the air flow passage adjacent the filter track, the gasket retainer frame including segments forming a rectangular frame bordering an air flow window or cell; and, a gasket mounted on the retainer frame segments, the gasket including a resilient seal member projecting from the gasket retainer frame and extending along a substantially closed loop around the air flow window or cell for yieldably engaging a filter element supported on the guide track in air flow alignment with the air flow window or cell.

10. Air flow filter apparatus including an air filter housing and a gasket assembly for establishing a seal against a filter element that is supported on a guide track disposed in an operative service position across an air flow passage in the air filter housing, the gasket assembly including a gasket retainer frame extending across the air flow passage adjacent the guide track and a flexible gasket mounted on the gasket retainer frame, the flexible gasket including a resilient seal member extending along a substantially closed loop for yieldably engaging a filter element supported on the guide track in the operative service position.

11. Air flow filter apparatus comprising an air flow housing, a guide track for supporting an air filter in an operative service position across an air flow passage within the air flow housing, and a gasket assembly for engaging an air filter supported on the guide track, the gasket assembly including a gasket retainer frame disposed adjacent the guide track, the gasket retainer frame forming the border of an air flow window or cell, and including a gasket mounted on the gasket retainer frame, the gasket including a resilient seal member projecting from the gasket retainer frame and forming a closed loop around the air flow window or cell for yieldably engaging the face of a filter element supported on the guide track in air flow alignment with the air flow window or cell.

12. Air flow filter apparatus comprising an air flow housing, a first guide track for supporting a first air filter in an operative service position across an air flow passage within the air flow housing, a second guide track for supporting a second air filter in air flow alignment with the first air filter, and a gasket assembly for simultaneously engaging and sealing against a first air filter and a second air filter supported in the operative service position on the first guide track and on the second guide track, respectively, the gasket assembly including a gasket retainer frame disposed intermediate the first guide track and the second guide track, the gasket retainer frame forming the border of an air flow window or cell, and including a gasket mounted on the gasket retainer frame, the gasket including a first resilient seal member projecting from the gasket retainer frame and extending around the air flow window or cell for yieldably engaging the face of the first filter element and the gasket including a second resilient seal member projecting from the gasket retainer frame and extending around the air flow window or cell for yieldably engaging the face of the second filter element.

13. Air flow filter apparatus as set forth in claim 12, wherein the gasket retainer frame comprises frame segments forming the border around the air flow window or cell, and each frame segment being intersected by a longitudinal retainer slot, and the flexible gasket including a wedge strip extending through the retainer slots.

14. Air flow filter apparatus as set forth in claim 12, wherein the first guide track and the second guide track are integrally formed of extruded metal.

15. Air flow filter apparatus as set forth in claim 12, the first resilient seal member and the second resilient seal member being integrally formed in a strip of synthetic polymer material.

16. Air flow filter apparatus as set forth in claim 12, wherein the flexible gasket including a wedge strip integrally formed with the first resilient seal member and the second resilient seal member.

\* \* \* \* \*